United States Patent
Li et al.

(10) Patent No.: US 10,218,559 B2
(45) Date of Patent: Feb. 26, 2019

(54) DATA TRANSMISSION METHOD AND APPARATUS

(71) Applicant: Huawei Technologies Co., Ltd., Shenzhen, Guangdong (CN)

(72) Inventors: Yue Li, Shenzhen (CN); Xiaolong Guo, Beijing (CN); Song Zhu, Beijing (CN); Fei Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/892,189

(22) Filed: Feb. 8, 2018

(65) Prior Publication Data

US 2018/0167256 A1 Jun. 14, 2018

Related U.S. Application Data

(63) Continuation of application No. 14/623,641, filed on Feb. 17, 2015, now Pat. No. 9,923,754, which is a
(Continued)

(51) Int. Cl.
*H04L 1/00* (2006.01)
*H04L 29/06* (2006.01)
(Continued)

(52) U.S. Cl.
CPC ........ *H04L 29/0653* (2013.01); *H04L 1/0091* (2013.01); *H04W 12/06* (2013.01);
(Continued)

(58) Field of Classification Search
CPC . H04L 29/0653; H04L 1/0091; H04L 1/0083; H04L 47/70; H04W 12/06
See application file for complete search history.

(56) References Cited

U.S. PATENT DOCUMENTS

2009/0285237 A1 11/2009 Chun et al.
2012/0057547 A1* 3/2012 Lohr ............... H04L 5/0007
370/329
(Continued)

FOREIGN PATENT DOCUMENTS

CN 101137232 A 3/2008
CN 101990304 A 3/2011
(Continued)

*Primary Examiner* — Omer S Mian

(57) ABSTRACT

A data sending method is provided. Media access control MAC payloads corresponding to a plurality of receiving devices are encapsulated in one MAC packet data unit (PDU), where the MAC PDU includes a header, the MAC payloads and identification information of each receiving device in the plurality of receiving devices; and the header includes a plurality of subheaders, the plurality of subheaders is subheaders respectively corresponding to a MAC payload corresponding to each receiving device, the MAC payload corresponding to each receiving device includes a MAC control element (CE) and/or a MAC service data unit (SDU), and the identification information is used for identifying each receiving device. The MAC PDU is sent. In the foregoing solutions, transmission of a MAC PDU during multi-user cooperated communication is implemented.

11 Claims, 8 Drawing Sheets

Related U.S. Application Data continuation of application No. PCT/CN2012/080281, filed on Aug. 17, 2012.

(51) Int. Cl.
  *H04W 28/06* (2009.01)
  *H04W 12/06* (2009.01)
  *H04W 80/02* (2009.01)
  *H04W 72/12* (2009.01)

(52) U.S. Cl.
  CPC ........ *H04W 28/065* (2013.01); *H04W 72/121* (2013.01); *H04W 80/02* (2013.01)

(56) References Cited

U.S. PATENT DOCUMENTS

| | | | | |
|---|---|---|---|---|
| 2012/0163235 A1* | 6/2012 | Ho | ................. | H04W 76/023 |
| | | | | 370/254 |
| 2012/0281549 A1* | 11/2012 | Yu | ................. | H04W 28/06 |
| | | | | 370/242 |

FOREIGN PATENT DOCUMENTS

| | | | |
|---|---|---|---|
| CN | 102026411 A | 4/2011 |
| CN | 102595624 A | 7/2012 |
| EP | 2658338 A1 | 10/2013 |
| WO | 2010118371 A1 | 10/2010 |

* cited by examiner

DATA TRANSMISSION METHOD AND APPARATUS

CROSS-REFERENCE TO RELATED APPLICATIONS

This application is a continuation of U.S. patent application Ser. No. 14/623,641, filed on Feb. 17, 2015, which is a continuation of International Application No. PCT/CN2012/080281, filed on Aug. 17, 2012. All of the afore-mentioned patent applications are hereby incorporated by reference in their entireties.

TECHNICAL FIELD

Embodiments of the present invention relate to the field of wireless communications, and in particular, to a data transmission method and apparatus.

BACKGROUND

With the rapid development of mobile communications technologies, mobile communications systems of various modes have come into being, for example, a global system of mobile communication (GSM) network, a general packet radio service (GPRS) network, a wideband code division multiple access (WCDMA) network, a CDMA2000 network, a time division-synchronous code division multiple access (TD-SCDMA) network, a worldwide interoperability for microwave access (WiMAX) network, and long term evolution (LTE) network. Such mobile communications systems not only provide voice communication services, but generally also provide data communication services. Therefore, users may upload and download various data by using the data communication services provided by such mobile communications systems.

However, all current communication means are used for sending or receiving data for a single user equipment (UE). Even if another enhanced communication means is used to improve reliability and/or throughput of data transmission of the user equipment, for example, in an LTE system, coordinated multipoint transmission/reception technology (CoMP) is used to improve the reliability of a user equipment at an edge of a cell, and carrier aggregation (CA) is used to improve the throughput of the cell, which is still an operation for a single user equipment. Once the channel condition of the user equipment deteriorates, the throughput and/or reliability of data transmission of the user equipment will drop abruptly.

This requires introduction of multi-user cooperated communication, i.e., data transmission between a base station and a first UE further requires forwarding through a second UE, which makes it possible to select an air interface path, thereby implementing multi-user diversity.

The prior art does not provide a solution how to transmit a media access control packet data unit (MAC PDU) of multi-user cooperated communication.

SUMMARY

In view of this, embodiments of the present invention provide a data transmission method and apparatus, so as to solve a problem of how to transmit a MAC PDU of multi-user cooperated communication.

In a first aspect, a data sending method is provided and includes:

encapsulating media access control MAC payloads corresponding to a plurality of user equipments UEs in one MAC packet data unit PDU, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC control element CE and/or a MAC service data unit SDU, and the identification information is used for identifying each UE; and sending the MAC PDU.

In a first possible implementation manner of the first aspect, the encapsulating MAC payloads corresponding to a plurality of UEs in one MAC PDU includes:

encapsulating the MAC payloads corresponding to the plurality of UEs in the MAC PDU by taking a MAC payload of each UE as a group, where positions of MAC payloads corresponding to one UE in the UEs are continuous, and positions of subheaders that are corresponding to the MAC payloads corresponding to the one UE are continuous.

With reference to the first aspect or the first possible implementation manner of the first aspect, in a second possible implementation manner, the identification information is a value represented by a reserved bit of each subheader in the plurality of subheaders, where the value represented by the reserved bit is one-to-one corresponding to the plurality of UEs.

With reference to the second possible implementation manner of the first aspect, in a third possible implementation manner, the identification information is a MAC CE used for bearing a UE identifier, where the UE identifier is an identifier of each UE, and each UE corresponds to one MAC CE used for bearing the UE identifier and corresponds to one UE identifier; and a position of the MAC CE used for bearing the UE identifier in all MAC payloads of one UE indicates a position of all the MAC payloads of the one UE in the MAC PDU.

With reference to the third possible implementation manner of the first aspect, in a fourth possible implementation manner, the MAC CE used for bearing the UE identifier is located at the first or last one of all the MAC payloads of the one UE.

With reference to the third possible implementation manner or fourth possible implementation manner of the first aspect, in a fifth possible implementation manner, the identification information for indicating the UE is a cell-radio network temporary identifier C-RNTI of the UE.

With reference to the first possible implementation manner of the first aspect, in a sixth possible implementation manner, all the subheaders corresponding to each UE include a specific subheader, where the specific subheader serves as the identification information of each UE.

With reference to the sixth possible implementation manner of the first aspect, in a seventh possible implementation manner, the specific subheader includes two reserved bits, the reserved bits in the specific subheader are set to a first specific value, and the first specific values in the specific subheaders corresponding to all the UEs are the same; and in the header, the group corresponding to each UE appears in negotiated order, and the first specific value is the identification information and is used for determining all the subheaders corresponding to each UE in the plurality of UEs, so as to determine, according to the negotiated order of each UE, a UE that is corresponding to all the subheaders corresponding to each UE; or the specific subheader includes a logical channel identifier LCID field, the LCID field of the specific subheader is set to a first LCID, and in the header, the group corresponding to each UE appears in negotiated order, where the identification information is the first LCID and first LCIDs in the specific subheaders corresponding to all the UEs are the same, and the first LCID is used for determining all the subheaders corresponding to each UE in the plurality of UEs, so as to determine, according to the negotiated order of each UE, a UE that is corresponding to all the subheaders corresponding to each UE; or the specific subheader includes a logical channel identifier LCID field, the LCID field of the specific subheader is set to a second LCID corresponding to each UE, and the specific subheader does not correspond to any MAC payload, where the identification information of the UE is the second LCID, different UEs correspond to different second LCIDs, and the second LCID is different from a third LCID used for identifying the MAC payload.

With reference to the sixth possible implementation manner or seventh possible implementation manner of the first aspect, in an eighth possible implementation manner, the specific subheader is the a subheader or a last subheader in all the subheaders that are corresponding to the MAC payloads corresponding to the one UE.

In a second aspect, a data receiving method is provided and includes:

receiving one MAC packet data unit PDU encapsulated with media access control MAC payloads corresponding to a plurality of user equipments UEs, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC control element CE and/or a MAC service data unit SDU, and the identification information is used for identifying each UE; and determining each UE corresponding to each MAC payload by parsing the MAC PDU according to the identification information of each UE and the header in the MAC PDU.

In a first possible implementation manner of the second aspect, the determine each UE corresponding to each MAC payload by parsing the MAC PDU according to the identification information of each UE and the header in the MAC PDU includes:

if the identification information is a value represented by a reserved bit of each subheader in the plurality of subheaders, determining a corresponding UE according to the value represented by the reserved bits; or if the identification information is a MAC CE used for bearing a UE identifier, determining a UE corresponding to the UE identifier according to the MAC CE used for bearing the UE identifier, and determining, according to a position of the MAC CE used for bearing the UE identifier in all MAC payloads of the UE corresponding to the UE identifier, all the MAC payloads of the UE corresponding to the UE identifier; or if the identification information is a specific subheader, determining, according to order of appearance of a plurality of specific subheaders in the MAC PDU, UEs corresponding to the plurality of specific subheaders, and determining all MAC payloads of a UE corresponding to each specific subheader in the plurality of specific subheaders according to positions of the plurality of specific subheaders in the header, where the reserved bits in the specific subheader are set to a first specific value, and the first specific values in the specific subheaders corresponding to all the UEs are the same; and in the header, the MAC payloads corresponding to the UEs appear by taking a MAC payload of each UE as a group, order of the groups is negotiated, and the first specific value is the identification information and is used for determining all the subheaders corresponding to each UE in the plurality of UEs; or if the identification information is a specific subheader, determining, according to order of appearance of a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where a logical channel identifier LCID field in the specific subheader is set to a first LCID and the first LCIDs in the specific subheaders corresponding to all the UEs are the same, and the first LCID is used for determining all the subheaders corresponding to each UE in the plurality of UEs; and in the header, the MAC payloads corresponding to the UEs appear by taking a MAC payload of each UE as a group, and order of the groups is negotiated; or if the identification information is a specific subheader, determining, according to values of LCID fields in a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where the value of the LCID field is a second LCID, the identification information of the UE is the second LCID, different UEs correspond to different second LCIDs, and the second LCID is different from a third LCID used for identifying the MAC payload, and in the header, the MAC payloads corresponding to the UEs appear by taking a MAC payload of each UE as a group.

In a third aspect, a data sending apparatus is provided and includes:

a data encapsulating module, configured to encapsulate media access control MAC payloads corresponding to a plurality of user equipments UEs in one MAC packet data unit PDU, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC control element CE and/or a MAC service data unit SDU, and the identification information is used for identifying each UE; and a sending module, configured to send the MAC PDU encapsulated by the data encapsulating module to a data receiving end.

In a first possible implementation manner of the third aspect, the data encapsulating module is specifically configured to encapsulate the MAC payloads corresponding to the plurality of UEs in the MAC PDU by taking a MAC payload of each UE as a group, where positions of MAC payloads corresponding to one UE in the UEs are continuous, and positions of subheaders that are corresponding to the MAC payloads corresponding to the one UE are continuous.

With reference to the third aspect or the first possible implementation manner of the third aspect, in a second possible implementation manner, the data encapsulating module is specifically configured to use a value represented by a reserved bit of each subheader in the plurality of subheaders as the identification information, where the value represented by the reserved bit is one-to-one corresponding to the plurality of UEs.

With reference to the first possible implementation manner of the third aspect, in a third possible implementation manner, the data encapsulating module is specifically configured to use a MAC CE used for bearing a UE identifier as the identification information, where the UE identifier is an identifier of each UE, and each UE corresponds to one MAC CE used for bearing the UE identifier and corresponds to one UE identifier; and a position of the MAC CE used for bearing the UE identifier in all MAC payloads of one UE indicates a position of all the MAC payloads of the one UE in the MAC PDU.

With reference to the third possible implementation manner of the third aspect, in a fourth possible implementation manner, the data encapsulating module is specifically configured to encapsulate the MAC CE used for bearing the UE identifier in the first or last one of all the MAC payloads of the one UE.

With reference to the third possible implementation manner or fourth possible implementation manner of the third aspect, in a fifth possible implementation manner, the data encapsulating module is specifically configured to use a cell-radio network temporary identifier C-RNTI of the UE as the identification information of the UE.

With reference to the first possible implementation manner of the third aspect, in a sixth possible implementation manner, the data encapsulating module is specifically configured to encapsulate a specific subheader respectively corresponding to each UE in the header, where the specific subheader serves as the identification information of each UE.

With reference to the sixth possible implementation manner of the third aspect, in a seventh possible implementation manner, the data encapsulating module is specifically configured to encapsulate the a specific subheader respectively corresponding to each UE in the header in the following manner:

setting reserved bits in the specific subheader to a first specific value, and encapsulating all the subheaders corresponding to each UE by taking a MAC payload of each UE as a group, where the first specific values in the specific subheaders corresponding to all the UEs are the same; and in the header, the group corresponding to each UE appears in negotiated order, and the first specific value is the identification information and is used for determining all the subheaders corresponding to each UE in the plurality of UEs, so that the data receiving end determines, according to the negotiated order of each UE, a UE that is corresponding to all the subheaders corresponding to each UE; or setting a LCID field in the specific subheader to a first LCID, and encapsulating all the subheaders corresponding to each UE by taking a MAC payload of each UE as a group, where the identification information is the first LCID and first LCIDs in the specific subheaders corresponding to all the UEs are the same, and the first LCID is used for determining all the subheaders corresponding to each UE in the plurality of UEs, so that the data receiving end determines, according to the negotiated order of each UE, a UE that is corresponding to all the subheaders corresponding to each UE; or setting a LCID field of the specific subheader to a second LCID corresponding to each UE, where the specific subheader does not correspond to any MAC payload, the identification information of the UE is the second LCID, different UEs correspond to different second LCIDs, and the second LCID is different from a third LCID used for identifying the MAC payload.

With reference to the sixth possible implementation manner or seventh possible implementation manner of the third aspect, in an eighth possible implementation manner, the data encapsulating module is specifically configured to encapsulate the specific subheader in a first subheader or a last subheader in all the subheaders corresponding to each UE.

In a fourth aspect, a data receiving apparatus is provided and includes:

a receiving module, configured to receive one MAC packet data unit PDU encapsulated with media access control MAC payloads corresponding to a plurality of user equipments UEs, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC control element CE and/or a MAC service data unit SDU, and the identification information is used for identifying each UE; and a parsing module, configured to determine each UE corresponding to each MAC payload by parsing the MAC PDU according to the identification information of each UE and the header in the MAC PDU received by the receiving module.

In a first possible implementation manner of the fourth aspect, the parsing module is specifically configured to determine each UE corresponding to each MAC payload by parsing the MAC PDU in the following manner:

if the identification information is a value represented by a reserved bit of each subheader in the plurality of subheaders, determining a corresponding UE according to the value represented by the reserved bits; or if the identification information is a MAC CE used for bearing a UE identifier, determining a UE corresponding to the UE identifier according to the MAC CE used for bearing the UE identifier, and determining, according to a position of the MAC CE used for bearing the UE identifier in all MAC payloads of the UE corresponding to the UE identifier, all the MAC payloads of the UE corresponding to the UE identifier; or if the identification information is a specific subheader, determining, according to order of appearance of a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where the reserved bits in the specific subheader are set to a first specific value, and the first specific values in the specific subheaders corresponding to all the UEs are the same; and in the header, the MAC payloads corresponding to the UEs appear by taking a MAC payload of each UE as a group, order of the groups is negotiated, and the first specific value is the identification information and is used for determining all the subheaders corresponding to each UE in the plurality of UEs; or if the identification information is a specific subheader, determining, according to order of appearance of a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where a logical channel identifier LCID field in the specific subheader is set to a first LCID and the first LCIDs in the specific subheaders corresponding to all the UEs are the same, and the first LCID is used for determining all the subheaders corresponding to each UE in the plurality of UEs; and in the header, the MAC payloads corresponding to the UEs appear by taking a MAC payload of each UE as a group, and order of the groups is negotiated; or if the identification information is a specific subheader, determining, according to values of LCID fields in a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where the value of the LCID field is a second LCID, the identification information of the UE is the second LCID, different UEs correspond to different second LCIDs, and the second LCID is different from a third LCID used for identifying the MAC payload, and in the header, the MAC payloads corresponding to the UEs appear by taking a MAC payload of each UE as a group.

In a fifth aspect, a data sending apparatus is provided and includes:

a baseband processor, configured to encapsulate media access control MAC payloads corresponding to a plurality of user equipments UEs in one MAC packet data unit PDU, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC control element CE and/or a MAC service data unit SDU, and the identification information is used for identifying each UE; and a sender, configured to send the MAC PDU encapsulated by the baseband processor to a data receiving end.

In a first possible implementation manner of the fifth aspect, the baseband processor is specifically configured to encapsulate the MAC payloads corresponding to the plurality of UEs in the MAC PDU by taking a MAC payload of each UE as a group, where positions of MAC payloads corresponding to one UE in the UEs are continuous, and positions of subheaders that are corresponding to the MAC payloads corresponding to the one UE are continuous.

With reference to the fifth aspect or the first possible implementation manner of the fifth aspect, in a second possible implementation manner, the baseband processor is specifically configured to use a value represented by a reserved bit of each subheader in the plurality of subheaders as the identification information, where the value represented by the reserved bit is one-to-one corresponding to the plurality of UEs.

With reference to the first possible implementation manner of the fifth aspect, in a third possible implementation manner, the baseband processor is specifically configured to use a MAC CE used for bearing a UE identifier as the identification information, where the UE identifier is an identifier of each UE, and each UE corresponds to one MAC CE used for bearing the UE identifier and corresponds to one UE identifier; and a position of the MAC CE used for bearing the UE identifier in all MAC payloads of one UE indicates a position of all the MAC payloads of the one UE in the MAC PDU.

With reference to the third possible implementation manner of the fifth aspect, in a fourth possible implementation manner, the baseband processor is specifically configured to encapsulate the MAC CE used for bearing the UE identifier in the first or last one of all the MAC payloads of the one UE.

With reference to the third possible implementation manner or fourth possible implementation manner of the fifth aspect, in a fifth possible implementation manner, the baseband processor is specifically configured to use a cell-radio network temporary identifier C-RNTI of the UE as the identification information of the UE.

With reference to the first possible implementation manner of the fifth aspect, in a sixth possible implementation manner, the baseband processor is specifically configured to encapsulate a specific subheader respectively corresponding to each UE in the header, where the specific subheader serves as the identification information of each UE.

With reference to the sixth possible implementation manner of the fifth aspect, in a seventh possible implementation manner, the baseband processor is specifically configured to encapsulate the a specific subheader respectively corresponding to each UE in the header in the following manner:

setting reserved bits in the specific subheader to a first specific value, and encapsulating all the subheaders corresponding to each UE by taking a MAC payload of each UE as a group, where the first specific values in the specific subheaders corresponding to all the UEs are the same; and in the header, the group corresponding to each UE appears in negotiated order, and the first specific value is the identification information and is used for determining all the subheaders corresponding to each UE in the plurality of UEs, so that the data receiving end determines, according to the negotiated order of each UE, a UE that is corresponding to all the subheaders corresponding to each UE; or setting a LCID field in the specific subheader to a first LCID, and encapsulating all the subheaders corresponding to each UE by taking a MAC payload of each UE as a group, where the identification information is the first LCID and first LCIDs in the specific subheaders corresponding to all the UEs are the same, and the first LCID is used for determining all the subheaders corresponding to each UE in the plurality of UEs, so that the data receiving end determines, according to the negotiated order of each UE, a UE that is corresponding to all the subheaders corresponding to each UE; or setting a LCID field of the specific subheader to a second LCID corresponding to each UE, where the specific subheader does not correspond to any MAC payload, the identification information of the UE is the second LCID, different UEs correspond to different second LCIDs, and the second LCID is different from a third LCID used for identifying the MAC payload.

With reference to the sixth possible implementation manner or seventh possible implementation manner of the fifth aspect, in an eighth possible implementation manner, the data encapsulating module is specifically configured to encapsulate the specific subheader in a first subheader or a last subheader in all the subheaders corresponding to each UE.

In a sixth aspect, a data receiving apparatus is provided and includes:

a receiver, configured to receive one MAC packet data unit PDU encapsulated with media access control MAC payloads corresponding to a plurality of user equipments UEs, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC control element CE and/or a MAC service data unit SDU, and the identification information is used for identifying each UE; and a baseband processor, configured to determine each UE corresponding to each MAC payload by parsing the MAC PDU according to the identification information of each UE and the header in the MAC PDU received by the receiver.

In a first possible implementation manner of the sixth aspect, the baseband processor is specifically configured to determine each UE corresponding to each MAC payload by parsing the MAC PDU in the following manner:

if the identification information is a value represented by a reserved bit of each subheader in the plurality of subheaders, determining a corresponding UE according to the value represented by the reserved bits; or if the identification information is a MAC CE used for bearing a UE identifier, determining a UE corresponding to the UE identifier according to the MAC CE used for bearing the UE identifier, and determining, according to a position of the MAC CE used for bearing the UE identifier in all MAC payloads of the UE corresponding to the UE identifier, all the MAC payloads of the UE corresponding to the UE identifier; or if the identification information is a specific subheader, determining, according to order of appearance of a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where the reserved bits in the specific subheader are set to a first specific value, and the first specific values in the specific subheaders corresponding to all the UEs are the same; and in the header, the MAC payloads corresponding to the UEs appear by taking a MAC payload of each UE as a group, order of the groups is negotiated, and the first specific value is the identification information and is used for determining all the subheaders corresponding to each UE in the plurality of UEs; or if the identification information is a specific subheader, determining, according to order of appearance of a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where a logical channel identifier LCID field in the specific subheader is set to a first LCID and the first LCIDs in the specific subheaders corresponding to all the UEs are the same, and the first LCID is used for determining all the subheaders corresponding to each UE in the plurality of UEs; and in the header, the MAC payloads corresponding to the UEs appear by taking a MAC payload of each UE as a group, and order of the groups is negotiated; or if the identification information is a specific subheader, determining, according to values of LCID fields in a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where the value of the LCID field is a second LCID, the identification information of the UE is the second LCID, different UEs correspond to different second LCIDs, and the second LCID is different from a third LCID used for identifying the MAC payload, and in the header, the MAC payloads corresponding to the UEs appear by taking a MAC payload of each UE as a group.

In a seventh aspect, a data transmission system is provided and includes the data sending apparatus according to the third aspect or any possible implementation manner of the third aspect and the data receiving apparatus according to the fourth aspect or any possible implementation manner of the fourth aspect.

In an eighth aspect, a data transmission system is provided and includes the data sending apparatus according to the fifth aspect or any possible implementation manner of the fifth aspect and the data receiving apparatus according to the sixth aspect or any possible implementation manner of the sixth aspect.

In a ninth aspect, a baseband processor is provided and configured to execute the steps in the method according to the first aspect or any possible implementation manner of the first aspect.

In a tenth aspect, a baseband processor is provided and configured to execute the steps in the method according to the second aspect or any possible implementation manner of the second aspect.

In the foregoing solutions, a MAC PDU encapsulating data corresponding to a plurality of UEs is sent, and the MAC PDU includes identification information of each UE, thereby implementing transmission of a MAC PDU during multi-user cooperated communication.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DETAILED DESCRIPTION

Figure 1:
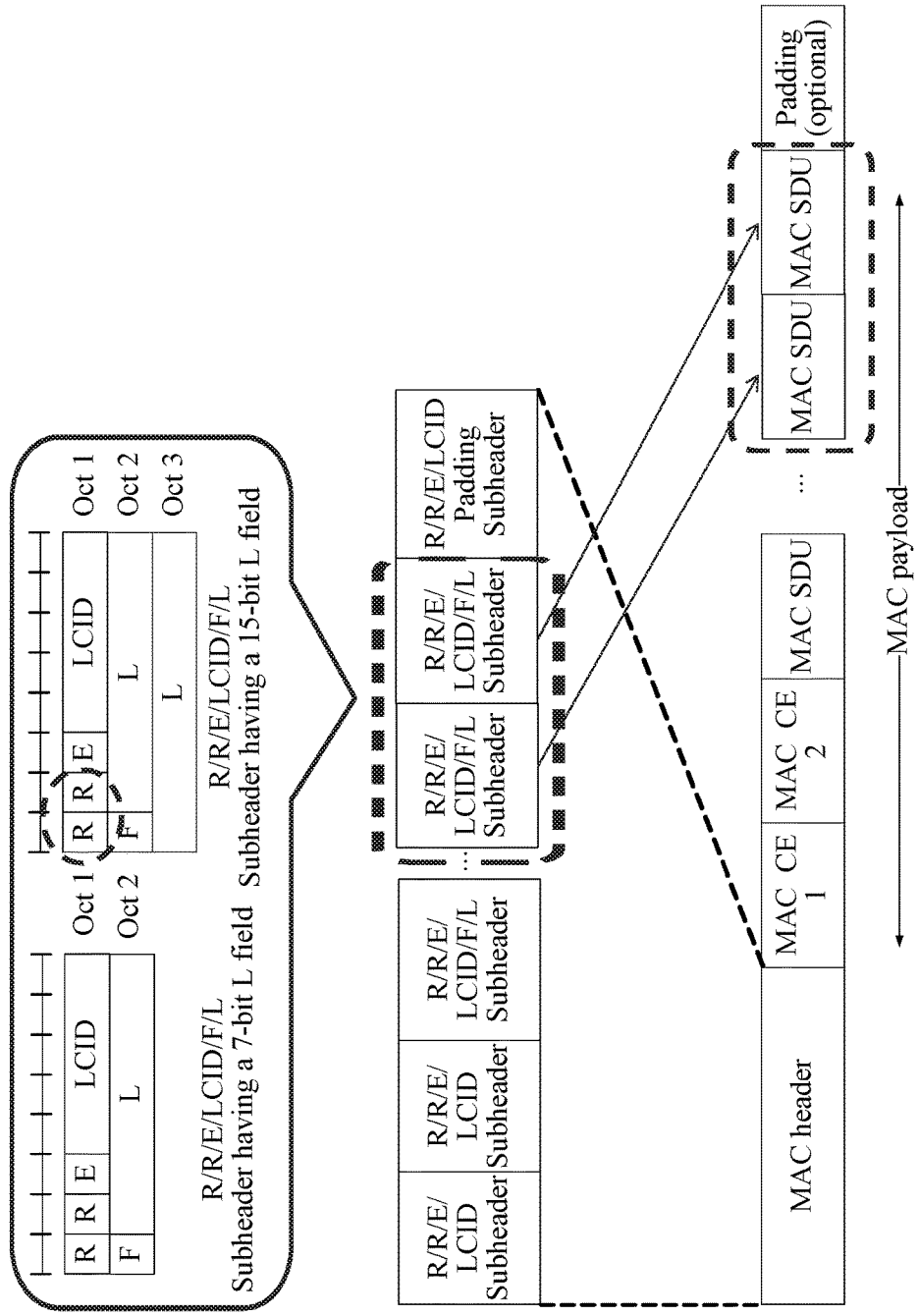
FIG. 1 is a structural diagram of a MAC PDU according to an implementation manner of the present invention.

In a MAC PDU in the prior art, data of different logical channels of a same user equipment (UE) is distinguished by using logical channel identifiers (LCID) in a header of the MAC PDU, so that a receiving end will not be confused with the data of different logical channels. A receiving end of uplink data is a base station, and a receiving end of downlink data is a UE.

In multi-user cooperated communication, no matter for uplink data or downlink data, it is possible that one MAC PDU includes data of a plurality of UEs, and data of one UE may be data of a plurality of logical channels of the UE. Data in the MAC PDU includes a MAC service data unit (SDU) and a MAC control element (CE). If the MAC PDU in the prior art is still used during multi-user cooperated communication, different UEs need to use completely different LCID ranges, in order to identify, according to an LCID, which logical channel of which UE data in the MAC PDU belongs to.

However, a LCID range of an existing MAC SDU is limited, numbered from 0 to 10, and if such a limited range is used to further distinguish UEs, the number of logical channels (i.e., the number of radio bearers) supported by each UE will be reduced greatly, and at the same time, the number of UEs that may cooperate during multi-user cooperated communication is also limited.

In another aspect, control signaling MAC CEs of the header in the MAC PDU in the prior art are all identified by a fixed LCID, and if different UEs have different LCID ranges, the fixed LCIDs of the MAC CEs need to be changed, resulting in poor compatibility with the prior art.

Therefore, the prior art does not provide a solution for one MAC PDU including data of a plurality of UEs.

Embodiments of the present invention provide a data transmission method and apparatus to implement transmission of a MAC PDU including data of a plurality of UEs, so as to distinguish data of different UEs in one MAC PDU including data of a plurality of UEs.

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be noted that, the embodiments of the present invention and features in the embodiments may be combined with each other at will in a case of no conflicts.

An embodiment of the present invention provides a MAC PDU. The data sending method may be applied to an LTE system and various evolved systems based on the LTE system, such as a long term evolution-advanced (LTE-A) system.

One MAC PDU includes: a header, MAC payloads corresponding to a plurality of UEs, and identification information of each UE in the plurality of UEs, where the header includes a plurality of subheaders, the plurality of subheaders is subheaders respectively corresponding to a MAC payload corresponding to each UE in the plurality of UEs, the MAC payload corresponding to each UE includes a MAC CE and/or a MAC SDU, and the identification information is used for identifying each UE.

In this embodiment, the identification information of the UEs is included in the MAC PDU, so that UEs corresponding to the MAC payloads in the MAC PDU can be distinguished.

Specifically, in the MAC PDU, the header is located before the MAC payloads corresponding to the plurality of UEs, and each subheader in the header is one-to-one corresponding to the MAC CE and/or MAC SDU included in the MAC PDU (i.e., if there is one MAC CE in the MAC payloads in the MAC PDU, there will be one subheader corresponding to the MAC CE in the header).

One UE may only have a MAC CE or only have a MAC SDU, or have both a MAC CE and a MAC SDU, which applies to all the embodiments of the present invention, and details are not repeatedly described herein.

The MAC PDU provided in this embodiment may have multiple implementation manners.

A MAC PDU provided in a first implementation manner is shown in FIG. 1.

In FIG. 1, the MAC PDU includes a MAC header, a MAC payload portion and optional padding. The MAC header is located at the head of one MAC PDU and followed by the MAC payload portion, and the optional padding is located at the tail of the MAC PDU. The MAC payload portion is all MAC payloads corresponding to the UEs, and the MAC payloads include a MAC CE and a MAC SDU. In FIG. 1, there are two MAC CEs, namely, MAC CE1 and MAC CE2, and there is a plurality of MAC SDUs. All the MAC CEs in the MAC PDU are located at the head portion of the MAC payloads, and all the MAC CEs are followed by all the MAC SDUs in the MAC PDU. The MAC header includes a plurality of subheaders, the plurality of subheaders respectively corresponds to the MAC CEs and MAC SDUs in the MAC payloads, and the plurality of subheaders further includes a subheader corresponding to the padding. Definitely, if the MAC PDU does not include the padding, the MAC header does not include the subheader corresponding to the padding. The subheaders are one-to-one corresponding to the MAC CEs and MAC SDUs in the MAC payloads, a position of a subheader, corresponding to one MAC SDU, in the MAC header corresponds to a position of the one MAC SDU in the MAC payloads, and a position of a MAC CE in the MAC payloads also corresponds to a position of a subheader, corresponding to the MAC CE, in the MAC header. One subheader includes a field having two reserved bits (R), a 1-bit extension (E) field, i.e., an E field, and a 5-bit LCID field. The E field is used for indicating whether there is any subheader after the subheader where the E field is located. Furthermore, the subheader of the MAC SDU further includes a 1-bit format (F) field and a length (L) field. The subheader corresponding to the MAC CE has a fixed length, and therefore does not have the L field. The L field of the subheader corresponding to the MAC SDU may be seven bits, and may also be 15 bits, and the F field is used for indicating the length of the L field.

It can be seen that, no matter for the MAC CE or the MAC SDU, the corresponding subheader has two reserved bits, i.e., the R field. In this implementation manner, the identification information is represented by using the reserved bits in each subheader in the header (i.e., the MAC header) of the MAC PDU, so as to identify different UEs. Therefore, the reserved bits in each subheader in the header of the MAC PDU may identify a total of four different UEs.

The identification information corresponding to each UE may be assigned by a base station for the UE at the beginning when multi-user cooperated communication is established, or the base station negotiates with each UE about the identification information corresponding to each UE. For example, the two reserved bits have four combinations, i.e., 00, 01, 10, and 11, respectively corresponding to four UEs.

The identification information of the UE included in each subheader of the header of the MAC PDU may indicate to which UE the subheader and the MAC CE or MAC SDU corresponding to the subheader belong, so that the UE corresponding to each MAC payload in the MAC PDU can be distinguished.

In this implementation manner, order of the subheaders of the UEs is not limited, and may be any order, for example, may be the same order as that in the prior art, i.e., the subheaders of the MAC CEs of all the UEs come first, followed by the subheaders of the MAC SDUs of all the UEs; or the subheaders of all MAC CEs and/or MAC SDUs of one UE come first, followed by the subheaders of all MAC CEs and/or MAC SDUs of another UE, and the rest can be deduced by analogy.

Further, by using the identification information of the UE in the subheader in combination with the LCID in the subheader, it can be distinguished to which logical channel of which UE the MAC CE or MAC SDU corresponding to the subheader belongs. Therefore, in this implementation manner, different UEs may use a same LCID, and accordingly, this implementation manner does not need to change the fixed LCID of the MAC CE, and has good compatibility with the prior art. It should be noted that, all MAC PDUs provided in the embodiments of the present invention can achieve this effect, and therefore details are not repeatedly described in the following.

Figure 2:
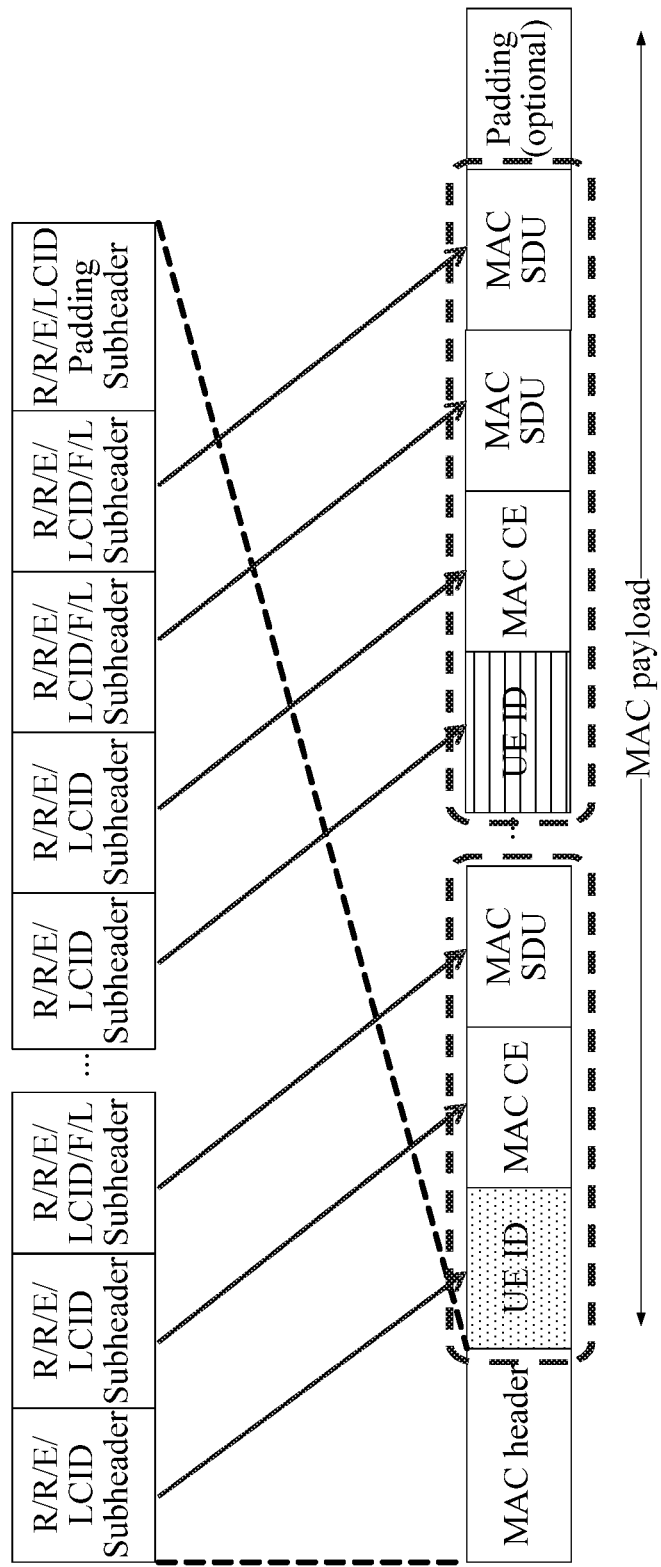
FIG. 2 is a structural diagram of a MAC PDU according to another implementation manner of the present invention.

A MAC PDU provided in a second implementation manner is shown in FIG. 2.

Different from FIG. 1, in FIG. 2, the MAC payloads is divided into a plurality of groups, where all payloads of one UE are grouped into one group, and the number of groups is equal to the number of UEs. It should be noted that, dividing of the MAC payloads into a plurality of groups is merely logical dividing, and there is no actual operation of grouping. MAC CEs and MAC SDUs in the MAC PDU appear by taking a MAC payload of each UE as a group, where each UE has a MAC CE used for bearing a UE ID. In FIG. 2, in a first group of MAC payloads corresponding to a first UE, the MAC CE used for bearing the UE ID is located at the head of the group of MAC payloads, followed by other MAC CEs of the UE. In FIG. 2, in addition to the MAC CE used for bearing the UE ID, the UE further has one MAC CE. All the MAC CEs of the UE are followed by all the MAC SDUs of the UE, all the MAC payloads of the first UE are followed by all the MAC payloads of a second UE, and the rest can be deduced by analogy.

In this implementation manner, all the subheaders corresponding to one UE are encapsulated at continuous positions in the header, and all the MAC payloads corresponding to the one UE are encapsulated at continuous positions after the header. That is to say, the subheaders in the header of the MAC PDU appear by taking a MAC payload of each UE as a group, i.e., all the subheaders of one UE are followed by all the subheaders of another UE; therefore, the MAC payloads corresponding to the subheaders also appear by taking a MAC payload of each UE as a group. All the MAC payloads of one UE include a MAC CE specially used for bearing a UE identifier, so that a data receiving end determines the UE to which all the MAC payloads belong according to the MAC CE specially used for bearing the UE identifier. In this implementation manner, the identification information of the UE is the MAC CE specially used for bearing the UE identifier.

Further, according to the MAC CE specially used for bearing the UE identifier, the data receiving end can further determine positions of all the MAC payloads belonging to one UE. Optionally, the MAC CE specially used for bearing the UE identifier may be located at the first or last one of all the MAC payloads of the UE, i.e., the first MAC payload or the last MAC payload in the group of MAC payloads corresponding to the UE, which, definitely, is not limited to the first or last one in the embodiment of the present invention. For example, the MAC CE specially used for bearing the UE identifier may also be located at another position in all the MAC payloads of the UE, for example, may be a position negotiated or preset by the data receiving end and a data sending end, for example, a third MAC payload in a group of MAC payloads. Therefore, this implementation manner does not limit the position of the MAC CE used for indicating the identification information of the UE, as long as the positions of all the MAC payloads corresponding to the UE can be determined according to the position of the MAC CE used for indicating the identification information of the UE.

Further, by using the identification information of the UE in the subheader in combination with the LCID in the subheader, it can be distinguished to which logical channel of which UE the MAC CE or MAC SDU corresponding to the subheader belongs. Therefore, in this implementation manner, different UEs may use a same LCID, and accordingly, this implementation manner does not need to change the fixed LCID of the MAC CE, and has good compatibility with the prior art.

In one example, the MAC CE specially used for bearing the UE identifier may be a MAC CE, where the MAC CE includes the identifier of the UE, a subheader corresponding to the MAC CE is identified by an unoccupied LCID, i.e., a new LCID is assigned for the MAC CE specially used for bearing the UE identifier, and the LCID identifies that the MAC CE is used for transmitting the identification information of the UE. In this case, the identification information of the UE may be a UE identifier (UE ID). The UE ID may be assigned by a base station for the user equipment, and the UE can be uniquely determined according to the UE ID. Definitely, the UE ID may also be an existing UE identifier.

In another example, the identifier of the UE may also be a cell-radio network temporary identifier (C-RNTI) of the UE in the prior art, which is used as the identification information of the UE in the embodiment of the present invention. Correspondingly, the MAC CE used for bearing the identification information of the UE is a MAC CE used for transmitting the C-RNTI.

In the prior art, when a UE is switched from an unsynchronized status to a synchronized status, or the UE is handed over to a target cell, the UE carries, in a message 3, a MAC CE including a C-RNTI of the UE. To avoid affecting such a function of the C-RNTI in the prior art, the use of C-RNTI may be limited in multiple manners, thereby avoiding confusion of a MAC CE of a C-RNTI serving as the identification information of the UE in a MAC PDU including MAC payloads corresponding to a plurality of UEs in the embodiment of the present invention with a MAC CE used in the prior art that includes a C-RNTI. For example, it may be specified that when a UE needs to carry a C-RNTI according to a traditional process (for example, recovered from the unsynchronized status to a connected status to send the message 3, or switched to a target cell), one MAC PDU does not include a MAC SDU or a MAC CEs of another UE, i.e., only MAC CEs of the UE and/or MAC SDUs of the UE are sent; for another example, when a UE needs to carry a C-RNTI according to a traditional process (for example, recovered from the unsynchronized status to a connected status to send the message 3, or switched to a target cell), a MAC SDU or a MAC CE of another UE may be carried, but the MAC CEs of the UE that uses the C-RNTI according to the traditional process and possible MAC SDUs must be located at the frontmost or rearmost of the whole MAC PDU, and so on. How to distinguish the application scenario of the C-RNTI in this embodiment from a normal application scenario of the C-RNTI is not limited in the embodiment of the present invention. Any method capable of distinguishing the application scenario of the C-RNTI in the embodiment of the present invention from the application scenario of the C-RNTI in the prior art may be used in the embodiment of the present invention.

In the prior art, in one MAC PDU, all MAC CEs must be placed before all MAC SDUs, while in this implementation manner, both the subheaders in the header of the MAC PDU and the MAC payloads corresponding to the subheaders appear by taking a MAC payload of each UE as a group, so that MAC CEs corresponding to one UE may appear after MAC SDUs corresponding to another UE, which overcomes the limitation in the prior art.

In this embodiment, the MAC CE specially used for bearing the UE identifier is added in the MAC PDU, and all the MAC CEs and MAC SDUs of a same UE and corresponding subheaders appear by taking a MAC payload of each UE as a group, so that UEs specifically corresponding to MAC CEs and MAC SDUs included in the MAC PDU can be distinguished.

Figure 3:
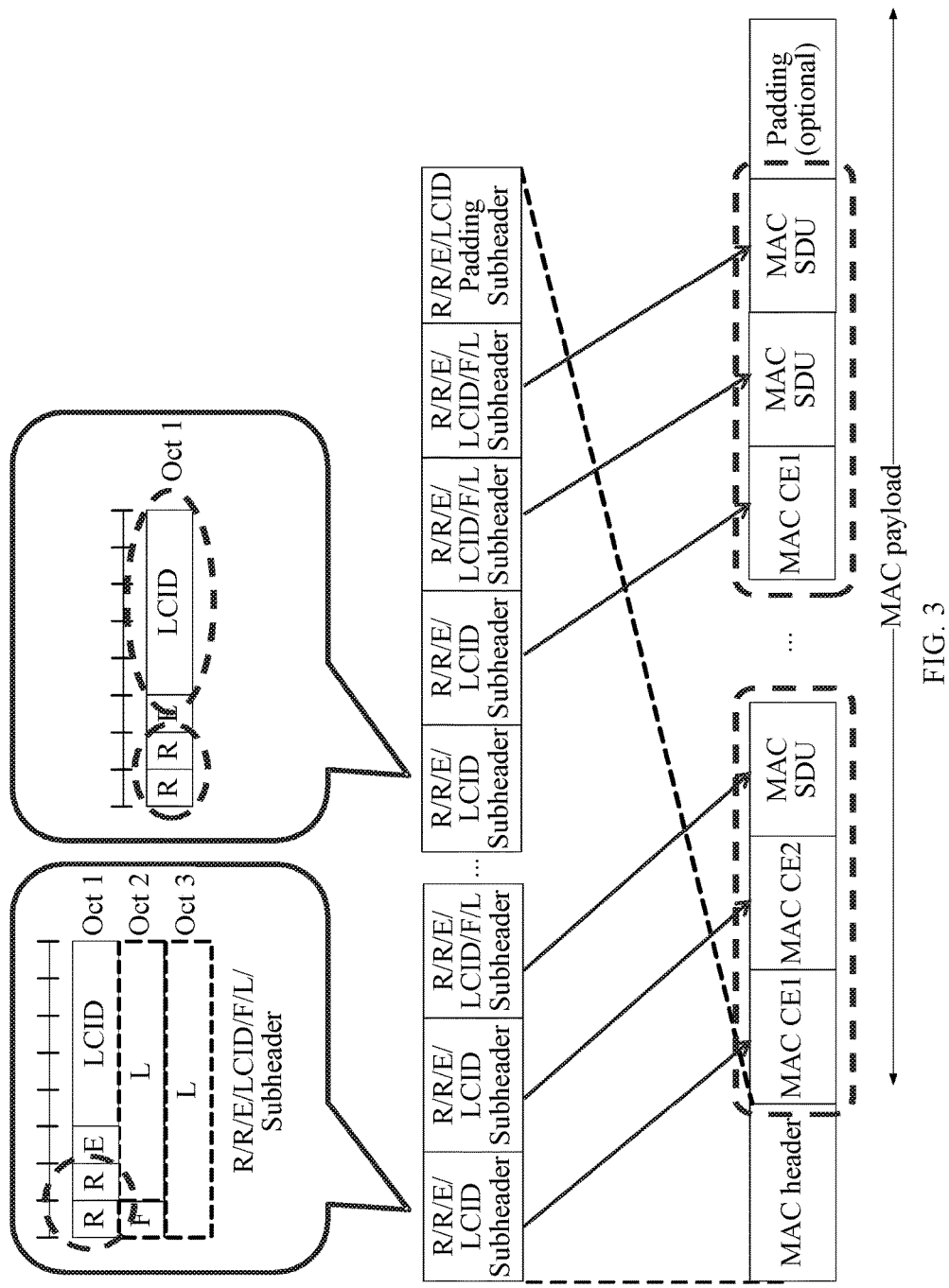
FIG. 3 is a structural diagram of a MAC PDU according to another implementation manner of the present invention.

A MAC PDU provided in a third implementation manner is shown in FIG. 3.

Different from FIG. 2, in FIG. 3, the MAC CE specially used for bearing the UE identifier is not included, but instead, the header includes a plurality of specific subheaders serving as the identification information of the UEs. Here, "particular" refers to that the function of the header is particular, i.e., the specific subheader serves as the identification information of the UE. A structure of the specific subheader may be the same as that of a MAC CE, i.e., the specific subheader includes two reserved bits, a 1-bit E field and a 5-bit LCID field. Definitely, the specific subheader may also have another particular structure, and a specific structure of the specific subheader is not limited in this implementation manner.

Same as the second implementation manner, in this implementation manner, the subheaders in the header of the MAC PDU also appear by taking a MAC payload of each UE as a group, and correspondingly, MAC CEs and MAC SDUs corresponding to the subheaders also appear by taking a MAC payload of each UE as a group. Different from the second implementation manner, in this implementation manner, the specific subheader is used as the identification information of the UE, i.e., the specific subheader is used for determining positions of all the subheaders corresponding to the UE indicated by the specific subheader. Therefore, in this implementation manner, the MAC CE specially used for indicating the identification information of the UE does not need to be added.

In this case, a base station and a UE may pre-agree order of the MAC payloads of the UEs in the MAC PDU. Therefore, a receiving end can determine positions of all subheaders of a certain UE according to the specific subheader, so as to determine positions of the MAC payloads corresponding to the certain UE. The UE corresponding to the MAC CE or MAC SDU can be determined with reference to the pre-negotiated order.

For one specific subheader, reserved bits in the subheader may be set to a first specific value to indicate that a MAC CE or MAC SDU corresponding to the subheader is the start or end of the MAC payloads corresponding to one UE, so that positions of all MAC CEs and/or MAC SDUs corresponding to the UE can be determined according to the subheader including the specific value. In this case, the LCID in the specific subheader may still be used, and therefore, the specific subheader may correspond to one MAC CE or MAC SDU. For example, the reserved bits in the subheader may be "00" by default. In this embodiment, the reserved bits of the subheader may be set to "11", "01" or "10" to indicate that a MAC CE or MAC SDU corresponding to the subheader is the start or end of the MAC payloads corresponding to one UE. Definitely, in the embodiment of the present invention, the specific subheader is also not limited to be corresponding to the start or end position of the MAC payloads corresponding to one UE, but may also be a position in all the MAC CEs and MAC SDUs of the UE that is negotiated by the data receiving end and the data sending end, as long as positions of all MAC CEs and MAC SDUs corresponding to one UE can be determined. If a certain UE does not have any MAC CE or MAC SDU to send, the specific subheader and subheaders corresponding to all MAC CEs and MAC SDUs of a next UE may be sent after the specific subheader of the UE. Alternatively, if a certain UE does not have any MAC CE or MAC SDU to send, another subheader including another second specific value may be used to indicate that the UE does not have any MAC CE or MAC SDU to send. The second specific value is different from the first specific value.

For another specific subheader, the LCID in the subheader may be set to a particular LCID to indicate that a MAC CE or MAC SDU corresponding to the subheader is the start or end or another position of the MAC payloads corresponding to one UE, so that positions of all MAC CEs and/or MAC SDUs corresponding to the UE can be determined according to the subheader including the particular LCID. Here, the particular LCID may be the value of any unoccupied LCID, and the specific subheader does not correspond to any MAC CE or MAC SDU in the MAC PDU, and is merely used for determining positions of MAC payloads corresponding to one UE. In this case, if a certain UE has a MAC CE or MAC SDU to send, the specific subheader is placed at a corresponding position in the group of subheaders of the UE. If a certain UE does not have any MAC CE or MAC SDU to send, the specific subheader and subheaders corresponding to all MAC CEs and MAC SDUs of a next UE may be sent after the specific subheader of the UE. Alternatively, if a certain UE does not have any MAC CE or MAC SDU to send, another subheader including another particular LCID may be used to indicate that the UE does not have any MAC CE or MAC SDU to send. In this implementation manner, all the UEs are all UEs in one UE group, and the plurality of UEs belongs to the UE group.

Likewise, in this embodiment, the subheader indicating the identification information of the UE is added in the MAC PDU, and all the MAC CEs and MAC SDUs of a same UE and corresponding subheaders appear by taking a MAC payload of each UE as a group, so that MAC payloads corresponding to different UEs in one MAC PDU including MAC payloads corresponding to a plurality of UEs can be distinguished.

Figure 4:
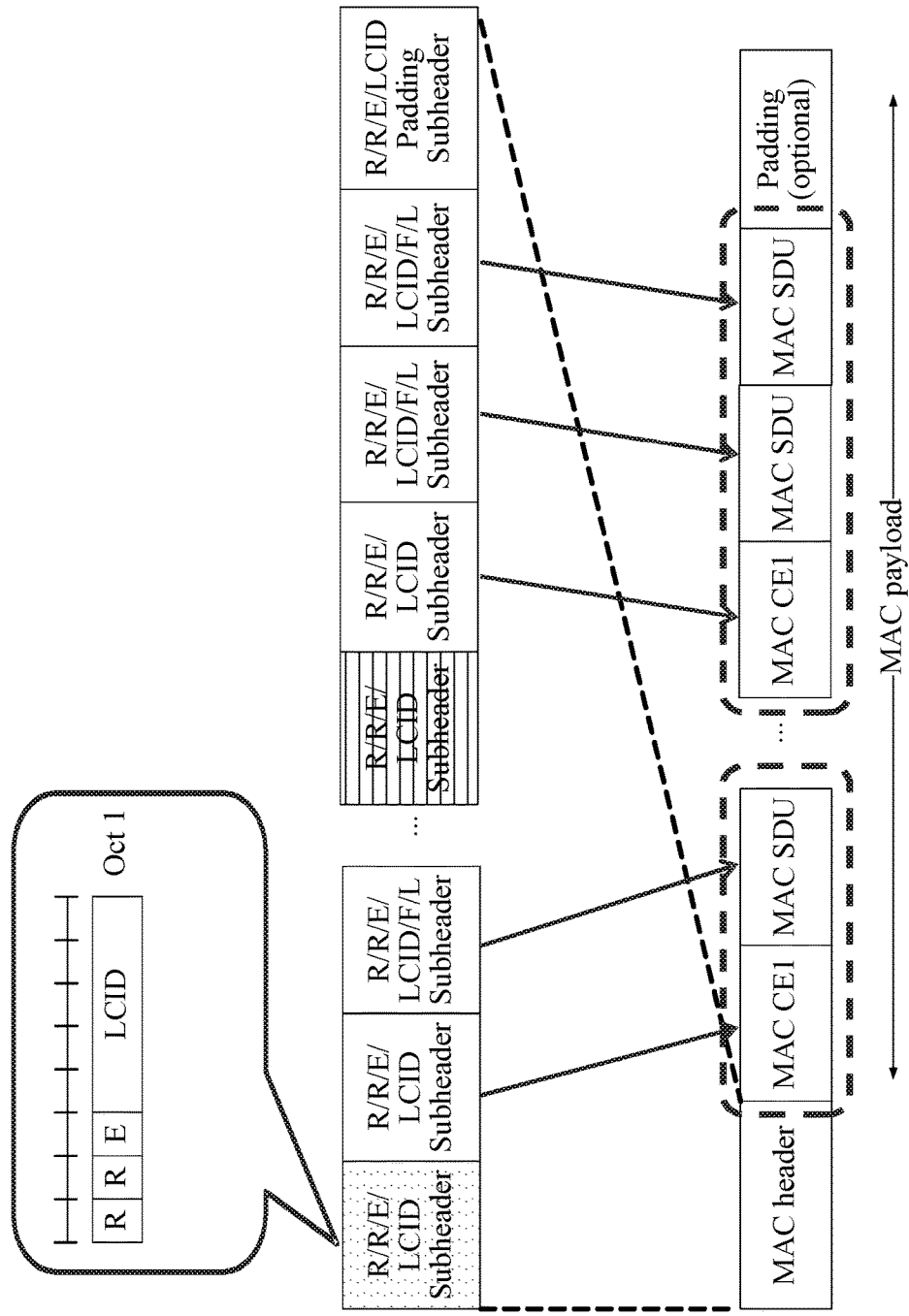
FIG. 4 is a structural diagram of a MAC PDU according to another implementation manner of the present invention.

A MAC PDU provided in a fourth implementation manner is shown in FIG. 4.

Different from FIG. 3, the LCID field in the specific subheader in FIG. 4 bears the identification information of each UE.

Same as the third implementation manner, in this implementation manner, the subheaders in the header of the MAC PDU also appear by taking a MAC payload of each UE as a group, and correspondingly, MAC CEs and MAC SDUs corresponding to the subheaders also appear by taking a MAC payload of each UE as a group. The difference lies in that, in this implementation manner, a subheader that does not correspond to any MAC CE or MAC SDU is also added to indicate positions of all subheaders corresponding to one UE in the header of the MAC PDU. Therefore, in this implementation manner, the MAC CE used for indicating the identification information of the UE also does not need to be added. In addition, in this implementation manner, the identification information of the UE is an LCID assigned for each UE, where different UEs correspond to different LCIDs, and the LCID serving as the identification information of the UE may be an unoccupied LCID in the prior art. The LCID in the subheader is the LCID assigned for each UE. Therefore, in this implementation manner, the subheader for indicating the positions of the subheaders corresponding to one UE in the header of the MAC PDU can also indicate to which UE the group of subheaders corresponds.

Similarly, in this implementation manner, the subheader for indicating the UE may be any negotiated position in the group of subheaders corresponding to the UE, optionally a first subheader or a last subheader in the group of subheaders.

In addition, since the subheaders include the identification information of the UE in this implementation manner, when a certain UE does not have any MAC payload to send, the MAC PDU may not include the subheaders of the UE.

In this embodiment, the MAC CE indicating the identification information of the UE is added in the MAC PDU, and all the MAC CEs and MAC SDUs of a same UE and corresponding subheaders appear by taking a MAC payload of each UE as a group, so that UEs specifically corresponding to MAC CEs and MAC SDUs included in the MAC PDU can be distinguished.

Figure 5:
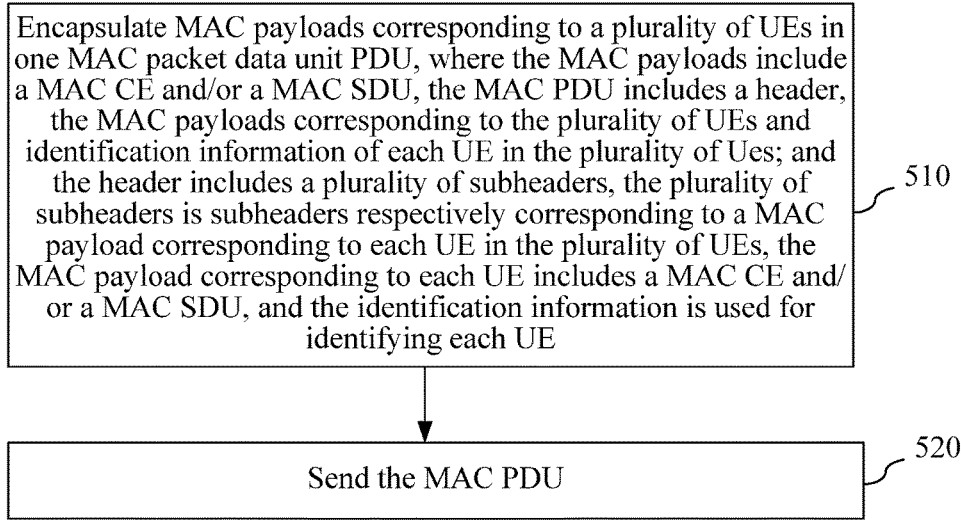
FIG. 5 is a flowchart of a data sending method according to an embodiment of the present invention.

Based on the MAC PDUs provided in the foregoing embodiments, another embodiment of the present invention provides a data sending method. The data sending method may be applied to an LTE system and various evolved systems based on the LTE system. As shown in FIG. 5, the method includes the following steps.

Step 510: Encapsulate MAC payloads corresponding to a plurality of UEs in one MAC packet data unit PDU, where the MAC payloads include a MAC CE and/or a MAC SDU, the MAC PDU includes a header, the MAC payloads corresponding to the plurality of UEs and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC CE and/or a MAC SDU, and the identification information is used for identifying each UE.

It should be noted that, in the embodiment of the present invention, data is the MAC payloads.

For the MAC PDU constructed in this step, reference may be made to each implementation manner described in the foregoing embodiments, and for brevity, details are not repeatedly described herein.

Step 520: Send the MAC PDU.

In this embodiment, a MAC PDU encapsulating data corresponding to a plurality of UEs is sent, and the MAC PDU includes identification information of each UE, thereby implementing transmission of a MAC PDU during multi-user cooperated communication. Moreover, in the embodiment of the present invention, the fixed LCID of the MAC CE does not need to be changed, which has good compatibility with the prior art.

Figure 6:
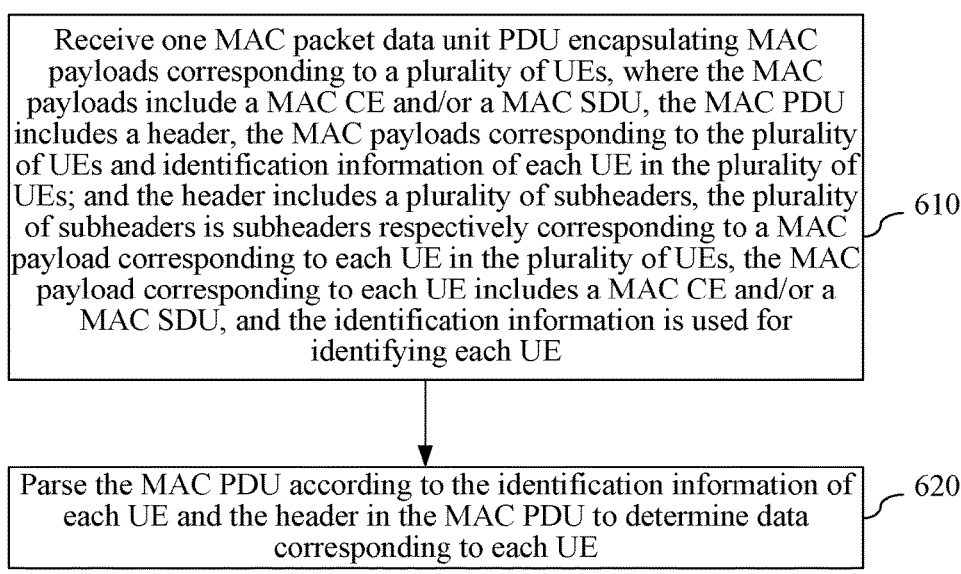
FIG. 6 is a flowchart of a data receiving method according to an embodiment of the present invention.

Based on the MAC PDUs provided in the foregoing embodiments, another embodiment of the present invention provides a data receiving method. The data sending method may be applied to an LTE system. As shown in FIG. 6, the method includes the following steps.

Step 610: Receive one MAC packet data unit PDU encapsulated with MAC payloads corresponding to a plurality of UEs, where the MAC payloads include a MAC CE and/or a MAC SDU, the MAC PDU includes a header, the MAC payloads corresponding to the plurality of UEs and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC CE and/or a MAC SDU, and the identification information is used for identifying each UE.

For a structure of the MAC PDU in this step, reference may be made to the implementation manners described in the foregoing embodiments, and for brevity, details are not repeatedly described herein.

Step 620: Determine the MAC payload corresponding to each UE by parsing the MAC PDU according to the identification information of each UE and the header in the MAC PDU.

In this step, the determining the MAC payload corresponding to each UE by parsing the MAC PDU is parsing according to the different identification information in the foregoing implementation manners.

For example, for the first implementation manner, the UE corresponding to the MAC payloads is determined according to the reserved bits in the subheaders corresponding to the MAC payloads.

For the second implementation manner, the UE indicated by the MAC CE is determined according to the MAC CE used for indicating the identification information of the UE, and the positions of all the MAC payloads of the UE are determined according to a negotiated position of the MAC CE used for indicating the identification information of the UE.

For the third implementation manner, according to a specific subheader and order of appearance of the subheader, the UE corresponding to the subheader is determined, and the positions of all the MAC payloads of the UE are determined according to a negotiated position of the specific subheader.

For the fourth implementation manner, the subheaders corresponding to the UE are determined according to the LCIDs of the subheaders, and the positions of all the MAC payloads of the UE are determined according to a negotiated position of the specific subheader.

In this embodiment, a MAC PDU encapsulated with data corresponding to a plurality of UEs is received, and data corresponding to each UE is determined according to identification information of each UE included in the MAC PDU, thereby implementing transmission of a MAC PDU during multi-user cooperated communication. Moreover, in the embodiment of the present invention, the fixed LCID of the MAC CE does not need to be changed, which has good compatibility with the prior art.

Figure 7:
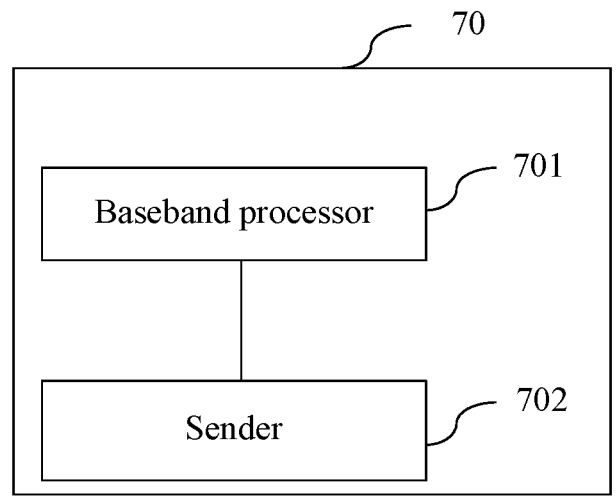
FIG. 7 is a schematic structural diagram of a data sending apparatus according to an embodiment of the present invention.

Based on the MAC PDUs provided in the foregoing embodiments, another embodiment of the present invention provides a data sending apparatus 70. The apparatus 70 is configured to execute the data sending method provided in the foregoing embodiment. In this embodiment, only a structure of the apparatus is briefly described, and for specific principles, reference may be made to the description in the method embodiment. As shown in FIG. 7, the apparatus includes a baseband processor 701 and a sender 702.

The baseband processor 701 is configured to encapsulate MAC payloads corresponding to a plurality of UEs in one MAC PDU, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC CE and/or a MAC SDU, and the identification information is used for identifying each UE.

For the MAC PDU encapsulated by the baseband processor 701, reference may be made to the implementation manners described in the foregoing embodiments corresponding to FIG. 1 to FIG. 4, and for brevity, details are not repeatedly described herein.

The sender 702 is configured to send the MAC PDU encapsulated by the baseband processor 701 to a data receiving end.

The data sending apparatus 70 provided in this embodiment may be embedded in a base station or may be a base station, and may also be embedded in a UE or may be a UE. In addition, the baseband processor 701 may also be another hardware module having a baseband processing function, but is not limited to a baseband processor. For example, the baseband processor 701 may be a general processor, a digital signal processor (DSP), an application-specific integrated circuit (ASIC), a field programmable gate array (FPGA) or another programmable logical component, discrete gate or transistor logical component, or discrete hardware component. The general processor may be a micro-processor, or the processor may also be any common processor, decoder or the like.

Furthermore, the data sending apparatus 70 in the embodiment of the present invention may further include a radio frequency processor, a receiver, a power controller, a processor, a memory and the like. The memory may include a read only memory and a random access memory, and provides instructions and data to the processor. A part of the memory may also include a non-volatile random access memory. In a specific application, the apparatus 70 may further include a carrier for accommodating the sender 702 and the receiver, so as to allow data transmission and reception between the apparatus 70 and a remote position. The sender 702 and the receiver may be coupled to an antenna. All components of the apparatus 70 are coupled to each other through a bus system, where the bus system not only includes a data bus, but also includes a power bus, a control bus, and a status signal bus.

In this embodiment, a MAC PDU encapsulating data corresponding to a plurality of UEs is sent, and the MAC PDU includes identification information of each UE, thereby implementing transmission of a MAC PDU during multi-user cooperated communication. Moreover, in the embodiment of the present invention, the fixed LCID of the MAC CE does not need to be changed, which has good compatibility with the prior art.

Figure 8:
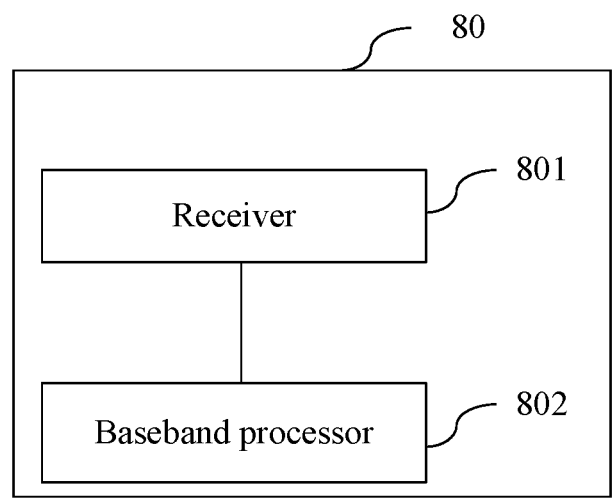
FIG. 8 is a schematic structural diagram of a data receiving apparatus according to an embodiment of the present invention.

Based on the MAC PDUs provided in the foregoing embodiments, another embodiment of the present invention provides a data receiving apparatus 80. The apparatus 80 is configured to execute the data receiving method provided in the foregoing embodiment. In this embodiment, only a structure of the apparatus 80 is briefly described, and for specific principles, reference may be made to the description in the method embodiment. As shown in FIG. 8, the apparatus includes a receiver 801 and a baseband processor 802.

The receiver 801 is configured to receive one MAC PDU encapsulating MAC payloads corresponding to a plurality of UEs, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC CE and/or a MAC SDU, and the identification information is used for identifying each UE.

For a structure of the MAC PDU in this step, reference may be made to the implementation manners described in the foregoing embodiments, and for brevity, details are not repeatedly described herein.

The baseband processor 802 is configured to determine each UE corresponding to each MAC payload by parsing the MAC PDU according to the identification information of each UE and the header in the MAC PDU received by the receiver 801.

In this step, the baseband processor 802 is specifically configured to determine data corresponding to each UE by parsing the MAC PDU according to the different identification information in the foregoing implementation manners. For details, refer to the description in the foregoing method embodiment, and details are not repeatedly described herein.

The data receiving apparatus 80 provided in this embodiment may be embedded in a base station of an LTE system or may be a base station of an LTE system, or may also be embedded in a UE or may be a UE. In addition, the baseband processor 802 may also be another hardware module having a baseband processing function, but is not limited to a baseband processor.

Furthermore, the data sending apparatus 80 in the embodiment of the present invention may further include a radio frequency processor, a sender, a power controller, a processor, a memory and the like. For details, refer to the description about the data receiving apparatus 70.

In this embodiment, a MAC PDU encapsulated with data corresponding to a plurality of UEs is received, and data corresponding to each UE is determined according to identification information of each UE included in the MAC PDU, thereby implementing transmission of a MAC PDU during multi-user cooperated communication. Moreover, in the embodiment of the present invention, the fixed LCID of the MAC CE does not need to be changed, which has good compatibility with the prior art.

Another embodiment of the present invention provides a data transmission system. The system includes the data sending apparatus 70 and the data receiving apparatus 80 in the foregoing embodiments. For specific principles, reference may be made to the description in the method embodiments, and details are not repeatedly described herein.

Figure 9:
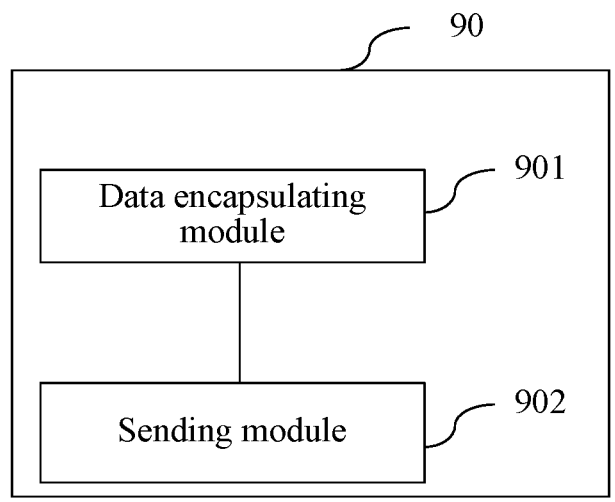
FIG. 9 is a schematic structural diagram of a data sending apparatus according to another embodiment of the present invention.

Another embodiment of the present invention provides a data sending apparatus 90. The apparatus 90 is configured to execute the data sending method provided in the foregoing embodiment. In this embodiment, only a structure of the apparatus 90 is briefly described, and for specific principles, reference may be made to the description in the method embodiment. As shown in FIG. 9, the apparatus 90 includes a data encapsulating module 901 and a sending module 902.

The data encapsulating module 901 is configured to encapsulate media access control MAC payloads corresponding to a plurality of user equipments UEs in one MAC packet data unit PDU, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC control element CE and/or a MAC service data unit SDU, and the identification information is used for identifying each UE.

The sending module 902 is configured to send the MAC PDU encapsulated by the data encapsulating module 901 to a data receiving end.

Optionally, the data encapsulating module 901 is specifically configured to encapsulate the MAC payloads corresponding to the plurality of UEs in the MAC PDU by taking a MAC payload of each UE as a group, where positions of MAC payloads corresponding to one UE in the UEs are continuous, and positions of subheaders that are corresponding to the MAC payloads corresponding to the one UE are continuous.

Further, the data encapsulating module 901 is specifically configured to use a value represented by a reserved bit of each subheader in the plurality of subheaders as the identification information, where the value represented by the reserved bit is one-to-one corresponding to the plurality of UEs.

Further, the data encapsulating module 901 is specifically configured to use a MAC CE used for bearing a UE identifier as the identification information, where the UE identifier is an identifier of each UE, and each UE corresponds to one MAC CE used for bearing the UE identifier and corresponds to one UE identifier; and a position of the MAC CE used for bearing the UE identifier in all MAC payloads of one UE indicates a position of all the MAC payloads of the one UE in the MAC PDU.

Further, the data encapsulating module 901 is specifically configured to encapsulate the MAC CE used for bearing the UE identifier in the first or last one of all the MAC payloads of the one UE.

Further, the data encapsulating module 901 is specifically configured to use a cell-radio network temporary identifier C-RNTI of the UE as the identification information of the UE.

Further, the data encapsulating module 901 is specifically configured to encapsulate a specific subheader respectively corresponding to each UE in the header, where the specific subheader serves as the identification information of each UE.

Further, the data encapsulating module 901 is specifically configured to encapsulate the a specific subheader respectively corresponding to each UE in the header in the following manner:

setting reserved bits in the specific subheader to a first specific value, and encapsulating all the subheaders corresponding to each UE by taking a MAC payload of each UE as a group, where the first specific values in the specific subheaders corresponding to all the UEs are the same; and in the header, the group corresponding to each UE appears in negotiated order, and the first specific value is the identification information and is used for determining all the subheaders corresponding to each UE in the plurality of UEs, so that the data receiving end determines, according to the negotiated order of each UE, a UE that is corresponding to all the subheaders corresponding to each UE; or setting a LCID field in the specific subheader to a first LCID, and encapsulating all the subheaders corresponding to each UE by taking a MAC payload of each UE as a group, where the identification information is the first LCID and first LCIDs in the specific subheaders corresponding to all the UEs are the same, and the first LCID is used for determining all the subheaders corresponding to each UE in the plurality of UEs, so that the data receiving end determines, according to the negotiated order of each UE, a UE that is corresponding to all the subheaders corresponding to each UE; or setting a LCID field of the specific subheader to a second LCID corresponding to each UE, where the specific subheader does not correspond to any MAC payload, the identification information of the UE is the second LCID, different UEs correspond to different second LCIDs, and the second LCID is different from a third LCID used for identifying the MAC payload.

Further, the data encapsulating module 901 is specifically configured to encapsulate the specific subheader in a first subheader or a last subheader in all the subheaders corresponding to each UE.

This embodiment adopts the same technical solution as the foregoing method embodiments, and therefore achieves the same technical effect. For details, refer to the description in the method embodiments.

Figure 10:
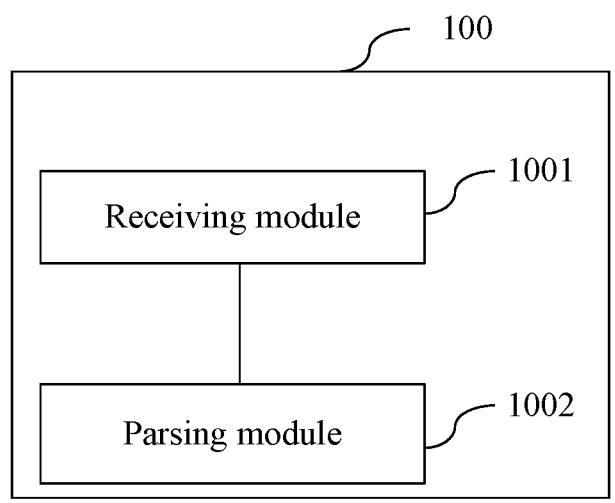
FIG. 10 is a schematic structural diagram of a data receiving apparatus according to another embodiment of the present invention.

Another embodiment of the present invention provides a data receiving apparatus 100. The apparatus 100 is configured to execute the data receiving method provided in the foregoing embodiment. In this embodiment, only a structure of the apparatus 100 is briefly described, and for specific principles, reference may be made to the description in the method embodiment. As shown in FIG. 10, the apparatus includes a receiving module 1001 and a parsing module 1002.

The receiving module 1001 is configured to receive one MAC packet data unit PDU encapsulated with media access control MAC payloads corresponding to a plurality of user equipments UEs, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC control element CE and/or a MAC service data unit SDU, and the identification information is used for identifying each UE.

The parsing module 1002 is configured to determine each UE corresponding to each MAC payload by parsing the MAC PDU according to the identification information of each UE and the header in the MAC PDU received by the receiving module 1001.

Specifically, the parsing module 1002 is specifically configured to determine each UE corresponding to each MAC payload by parsing the MAC PDU in the following manner:

if the identification information is a value represented by a reserved bit of each subheader in the plurality of subheaders, determining a corresponding UE according to the value represented by the reserved bits; or if the identification information is a MAC CE used for bearing a UE identifier, determining a UE corresponding to the UE identifier according to the MAC CE used for bearing the UE identifier, and determining, according to a position of the MAC CE used for bearing the UE identifier in all MAC payloads of the UE corresponding to the UE identifier, all the MAC payloads of the UE corresponding to the UE identifier; or if the identification information is a specific subheader, determining, according to order of appearance of a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where the reserved bits in the specific subheader are set to a first specific value, and the first specific values in the specific subheaders corresponding to all the UEs are the same; and in the header, the MAC payloads corresponding to the UEs appear by taking a MAC payload of each UE as a group, order of the groups is negotiated, and the first specific value is the identification information and is used for determining all the subheaders corresponding to each UE in the plurality of UEs; or if the identification information is a specific subheader, determining, according to order of appearance of a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where a logical channel identifier LCID field in the specific subheader is set to a first LCID and the first LCIDs in the specific subheaders corresponding to all the UEs are the same, and the first LCID is used for determining all the subheaders corresponding to each UE in the plurality of UEs; and in the header, the MAC payloads corresponding to the UEs appear by taking a MAC payload of each UE as a group, and order of the groups is negotiated; or if the identification information is a specific subheader, determining, according to values of LCID fields in a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where the value of the LCID field is a second LCID, the identification information of the UE is the second LCID, different UEs correspond to different second LCIDs, and the second LCID is different from a third LCID used for identifying the MAC payload, and in the header, the MAC payloads corresponding to the UEs appear by taking a MAC payload of each UE as a group.

This embodiment adopts the same technical solution as the foregoing method embodiments, and therefore achieves the same technical effect. For details, refer to the description in the method embodiments.

Figure 11:
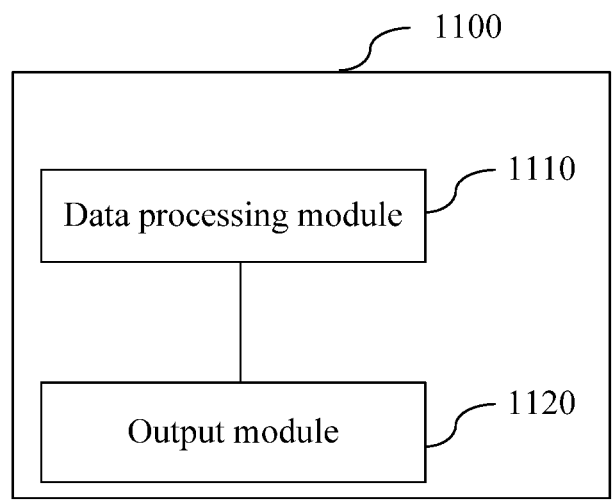
FIG. 11 is a schematic structural diagram of a baseband processor according to an embodiment of the present invention.
Figure 12:
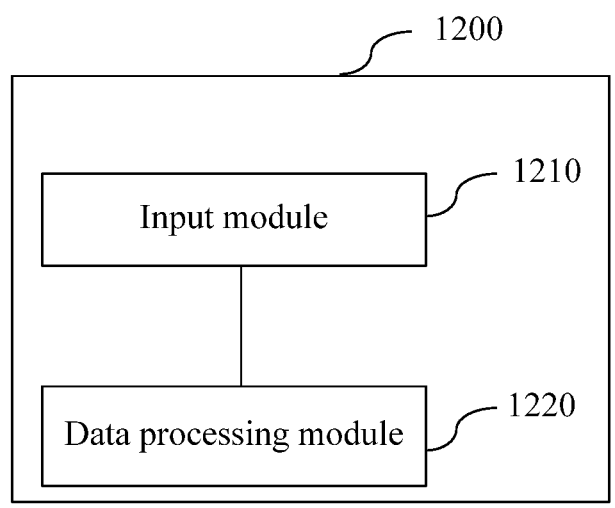
FIG. 12 is a schematic structural diagram of a baseband processor according to another embodiment of the present invention.

Another embodiment of the present invention provides a baseband processor 1100. The baseband processor 1100 is configured to execute the data sending method provided in the foregoing embodiment. In this embodiment, only a structure of the baseband processor 1100 is briefly described, and for specific principles, reference may be made to the description in the method embodiment. As shown in FIG. 11, the baseband processor 1100 includes a data processing module 1110 and an output module 1120.

The data processing module 1110 is configured to encapsulate media access control MAC payloads corresponding to a plurality of user equipments UEs in one MAC packet data unit PDU, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC control element CE and/or a MAC service data unit SDU, and the identification information is used for identifying each UE.

The output module 1120 is configured to output the MAC PDU encapsulated by the data processing module 1110.

Optionally, the data processing module 1110 is specifically configured to encapsulate the MAC payloads corresponding to the plurality of UEs in the MAC PDU by taking a MAC payload of each UE as a group, where positions of MAC payloads corresponding to one UE in the UEs are continuous, and positions of subheaders that are corresponding to the MAC payloads corresponding to the one UE are continuous.

Further, the data processing module 1110 is specifically configured to use a value represented by a reserved bit of each subheader in the plurality of subheaders as the identification information, where the value represented by the reserved bit is one-to-one corresponding to the plurality of UEs.

Further, the data processing module 1110 is specifically configured to use a MAC CE used for bearing a UE identifier as the identification information, where the UE identifier is an identifier of each UE, and each UE corresponds to one MAC CE used for bearing the UE identifier and corresponds to one UE identifier; and a position of the MAC CE used for bearing the UE identifier in all MAC payloads of one UE indicates a position of all the MAC payloads of the one UE in the MAC PDU.

Further, the data processing module 1110 is specifically configured to encapsulate the MAC CE used for bearing the UE identifier in the first or last one of all the MAC payloads of the one UE.

Further, the data processing module 1110 is specifically configured to use a cell-radio network temporary identifier C-RNTI of the UE as the identification information of the UE.

Further, the data processing module 1110 is specifically configured to encapsulate a specific subheader respectively corresponding to each UE in the header, where the specific subheader serves as the identification information of each UE.

Further, the data processing module 1110 is specifically configured to encapsulate the a specific subheader respectively corresponding to each UE in the header in the following manner:

setting reserved bits in the specific subheader to a first specific value, and encapsulating all the subheaders corresponding to each UE by taking a MAC payload of each UE as a group, where the first specific values in the specific subheaders corresponding to all the UEs are the same; and in the header, the group corresponding to each UE appears in negotiated order, and the first specific value is the identification information and is used for determining all the subheaders corresponding to each UE in the plurality of UEs, so that the data receiving end determines, according to the negotiated order of each UE, a UE that is corresponding to all the subheaders corresponding to each UE; or setting a LCID field in the specific subheader to a first LCID, and encapsulating all the subheaders corresponding to each UE by taking a MAC payload of each UE as a group, where the identification information is the first LCID and first LCIDs in the specific subheaders corresponding to all the UEs are the same, and the first LCID is used for determining all the subheaders corresponding to each UE in the plurality of UEs, so that the data receiving end determines, according to the negotiated order of each UE, a UE that is corresponding to all the subheaders corresponding to each UE; or setting a LCID field of the specific subheader to a second LCID corresponding to each UE, where the specific subheader does not correspond to any MAC payload, the identification information of the UE is the second LCID, different UEs correspond to different second LCIDs, and the second LCID is different from a third LCID used for identifying the MAC payload.

Further, the data processing module 1110 is specifically configured to encapsulate the specific subheader in a first subheader or a last subheader in all the subheaders corresponding to each UE.

This embodiment adopts the same technical solution as the foregoing method embodiments, and therefore achieves the same technical effect. For details, refer to the description in the method embodiments.

Another embodiment of the present invention provides a baseband processor 1200. The baseband processor 1200 is configured to execute the data receiving method provided in the foregoing embodiment. In this embodiment, only a structure of the baseband processor 1200 is briefly described, and for specific principles, reference may be made to the description in the method embodiment. As shown in FIG. 10, the apparatus includes an input module 1210 and a data processing module 1220.

The input module 1210 is configured to receive one MAC packet data unit PDU encapsulated with media access control MAC payloads corresponding to a plurality of user equipments UEs, where the MAC PDU includes a header, the MAC payloads and identification information of each UE in the plurality of UEs; and the header includes a plurality of subheaders, the plurality of subheaders is subheaders respectively corresponding to a MAC payload corresponding to each UE in the plurality of UEs, the MAC payload corresponding to each UE includes a MAC control element CE and/or a MAC service data unit SDU, and the identification information is used for identifying each UE.

The data processing module 1220 is configured to determine each UE corresponding to each MAC payload by parsing the MAC PDU according to the identification information of each UE and the header in the MAC PDU received by the input module 1210.

Specifically, the data processing module 1220 is specifically configured to determine each UE corresponding to each MAC payload by parsing the MAC PDU in the following manner:

if the identification information is a value represented by a reserved bit of each subheader in the plurality of subheaders, determining a corresponding UE according to the value represented by the reserved bits; or if the identification information is a MAC CE used for bearing a UE identifier, determining a UE corresponding to the UE identifier according to the MAC CE used for bearing the UE identifier, and determining, according to a position of the MAC CE used for bearing the UE identifier in all MAC payloads of the UE corresponding to the UE identifier, all the MAC payloads of the UE corresponding to the UE identifier; or if the identification information is a specific subheader, determining, according to order of appearance of a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where the reserved bits in the specific subheader are set to a first specific value, and the first specific values in the specific subheaders corresponding to all the UEs are the same; and in the header, the MAC payloads corresponding to the UEs appear by taking a MAC payload of each UE as a group, order of the groups is negotiated, and the first specific value is the identification information and is used for determining all the subheaders corresponding to each UE in the plurality of UEs; or if the identification information is a specific subheader, determining, according to order of appearance of a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where a logical channel identifier LCID field in the specific subheader is set to a first LCID and the first LCIDs in the specific subheaders corresponding to all the UEs are the same, and the first LCID is used for determining all the subheaders corresponding to each UE in the plurality of UEs; and in the header, the MAC payloads corresponding to the UEs appear by taking a MAC payload of each UE as a group, and order of the groups is negotiated; or if the identification information is a specific subheader, determining, according to values of LCID fields in a plurality of specific subheaders in the MAC PDU, UEs corresponding to the plurality of specific subheaders, and determining all MAC payloads of the UE corresponding to each specific subheader in the plurality of specific subheaders according to positions of the plurality of specific subheaders in the header, where the value of the LCID field is a second LCID, the identification information of the UE is the second LCID, different UEs correspond to different second LCIDs, and the second LCID is different from a third LCID used for identifying the MAC payload, and in the header, the MAC payloads corresponding to the UEs appear by taking a MAC payload of each UE as a group.

This embodiment adopts the same technical solution as the foregoing method embodiments, and therefore achieves the same technical effect. For details, refer to the description in the method embodiments.

Through the description in the foregoing implementation manners, a person skilled in the art may be clearly aware that the present invention may be implemented by hardware, or be implemented by firmware, or be implemented by a combination of hardware and firmware. When the present invention is implemented by software, the foregoing functions may be stored in a computer readable medium, or transmitted as one or more instructions or code on the computer readable medium. The computer readable medium includes a computer storage medium and a communication medium. The communication medium includes any medium that facilitates transmission of a computer program from one place to another place. The storage medium may be any usable medium that a computer can access. The following is taken as an example but is not limited: The computer readable medium may include a read only memory (ROM), a random access memory (RAM) or other optical disc memory, a disk storage medium or other disk storage device, or any other medium that can be used to carry or store an expected program code in an instruction or data structure form and can be accessed by a computer. In addition, any connection may appropriately become a computer readable medium. For example, if the software implements the transmission from a website, a server, or another remote source by using a coaxial cable, an optical fiber cable, a twisted pair cable, a digital subscriber line (DSL), or a wireless technology, such as infrared, radio, or microwave. Then, the coaxial cable, the optical fiber cable, the twisted pair cable, the DSL, or the wireless technology, such as infrared, radio, or microwave is included in fixation of a home medium. For example, a disk and a disc used in the present invention include a compressed disc (CD), a laser disc, an optical disc, a digital versatile disc (DVD), a floppy disk, and a blue-ray disc. Generally, a disk magnetically duplicates data, while a disc optically duplicates data by using laser. A combination of the foregoing should also fall within the protection scope of a computer readable medium.

In conclusion, the foregoing description is merely exemplary embodiments of the present invention, but is not intended to limit the protection scope of the present invention. Any modifications, equivalent replacements, or improvements made within the spirit and principle of the present invention shall fall within the protection scope of the present invention.

What is claimed is:

1. A data sending method, comprising:
encapsulating, by a terminal device, media access control (MAC) payloads, each corresponding to a different one of a plurality of receiving devices, in a MAC packet data unit (PDU), wherein the MAC PDU comprises a MAC header followed by the MAC payloads, the MAC header comprises a plurality of contiguous subheaders, each subheader in the plurality of subheaders corresponds to a different MAC payload in the MAC payloads, each subheader comprises a plurality of fields, a specific field of the plurality of fields carries identification information of a corresponding receiving device in the plurality of receiving devices, the MAC payloads comprise at least one kind of a MAC control element (CE) and a MAC service data unit (SDU) and do not comprise another MAC header, subheaders corresponding to a MAC CE have a different format than subheaders corresponding to a MAC SDU, the MAC payloads are contiguous without any intervening MAC header between adjacent MAC payloads, and the identification information of each receiving device is for identifying the corresponding receiving device; and
sending, by the terminal device, the MAC PDU to the plurality of receiving devices to be parsed by the plurality of receiving devices according to the identification information of each receiving device and the MAC header.

2. The method according to claim 1, wherein the specific field comprises a first field or a last field in an order of the plurality of fields of the subheader.

3. The method according to claim 1, wherein encapsulating MAC payloads, each corresponding to a different one of a plurality of receiving devices, in a MAC PDU comprises:
encapsulating the MAC payloads corresponding to the different one of the plurality of receiving devices in the MAC PDU by taking all MAC payloads of each receiving device as a group, wherein positions of MAC payloads corresponding to one receiving device in the plurality of receiving devices are contiguous.

4. The method according to claim 1, wherein:
the specific field comprises one or more reserved bits;
the identification information comprises a value represented by the one or more reserved bits; and
the value represented by the one or more reserved bits corresponds one-to-one to the plurality of receiving devices.

5. An apparatus, comprising:
a processor;
a storage medium comprising executable instructions which, when executed by the processor, cause the apparatus to:
encapsulate media access control (MAC) payloads, each corresponding to a different one of a plurality of receiving devices, in a MAC packet data unit (PDU), wherein the MAC PDU comprises a MAC header followed by the MAC payloads, the MAC header comprises a plurality of contiguous subheaders, each subheader in the plurality of subheaders corresponds to a different MAC payload in the MAC payloads, each subheader comprises a plurality of fields, a specific field of the plurality of fields carries identification information of a corresponding receiving device in the plurality of receiving devices, the MAC payloads comprise at least one kind of a MAC control element (CE) and a MAC service data unit (SDU) and do not comprise another MAC header, subheaders corresponding to a MAC CE have a different format than subheaders corresponding to a MAC SDU, the MAC payloads are contiguous without any intervening MAC header between adjacent MAC payloads, and the identification information of each receiving device is for identifying the corresponding receiving device, and
send the MAC PDU to the plurality of receiving devices to be parsed by the plurality of receiving devices according to the identification information of each receiving device and the MAC header.

6. The apparatus according to claim 5, wherein the specific field comprises a first field or a last field in an order of the plurality of fields of the subheader.

7. The apparatus according to claim 5, wherein to encapsulate MAC payloads, each corresponding to a different one of a plurality of receiving devices, in a MAC PDU, the executable instructions, when executed by the processor, cause the apparatus to:
encapsulate the MAC payloads corresponding to the different one of the plurality of receiving devices in the MAC PDU by taking all MAC payloads of each receiving device as a group, wherein positions of MAC payloads corresponding to one receiving device in the plurality of receiving devices are contiguous.

8. The apparatus according to claim 5, wherein:
the specific field comprises one or more reserved bits;
the identification information comprises a value represented by the one or more reserved bits; and the value represented by the one or more reserved bits corresponds one-to-one to the plurality of receiving devices.

9. A non-transitory computer-readable storage medium comprising instructions which, when executed by a computer, cause the computer to:

encapsulate media access control (MAC) payloads, each corresponding to a different one of a plurality of receiving devices, in a MAC packet data unit (PDU), wherein the MAC PDU comprises a MAC header followed by the MAC payloads, the MAC header comprises a plurality of contiguous subheaders, each subheader in the plurality of subheaders corresponds to a different MAC payload in the MAC payloads, each subheader comprises a plurality of fields, a specific field of the plurality of fields carries identification information of a corresponding receiving device in the plurality of receiving devices, the MAC payloads comprise at least one kind of a MAC control element (CE) and a MAC service data unit (SDU) and do not comprise another MAC header, subheaders corresponding to a MAC CE have a different format than subheaders corresponding to a MAC SDU, the MAC payloads are contiguous without any intervening MAC header between adjacent MAC payloads, and the identification information of each receiving device is for identifying the corresponding receiving device; and send the MAC PDU to the plurality of receiving devices, wherein the MAC PDU is configured to be parsed by the plurality of receiving devices according to the identification information of each receiving device and the MAC header.

10. The non-transitory computer-readable storage medium according to claim 9, wherein the specific field comprises a first field or a last field in an order of the plurality of fields of the subheader.

11. The non-transitory computer-readable storage medium according to claim 9, wherein to encapsulate MAC payloads, each corresponding to a different one of a plurality of receiving devices, in a MAC PDU, the instructions, when executed by the computer, cause the computer to:

encapsulate the MAC payloads corresponding to the different one of the plurality of receiving devices in the MAC PDU by taking all MAC payloads of each receiving device as a group, wherein positions of MAC payloads corresponding to one receiving device in the plurality of receiving devices are contiguous.

* * * * *